United States Patent [19]
Dalisa et al.

[11] 4,218,302
[45] Aug. 19, 1980

[54] ELECTROPHORETIC DISPLAY DEVICES

[75] Inventors: Andrew L. Dalisa, Cupertino, Calif.; Robert J. Seymour, Ossining, N.Y.

[73] Assignee: U.S. Philips Corporation, New York, N.Y.

[21] Appl. No.: 63,634

[22] Filed: Aug. 2, 1979

[51] Int. Cl.² ............... C25D 13/00; G03G 15/00; G05D 25/00
[52] U.S. Cl. ............... 204/299 R; 204/180 R; 350/362; 350/267; 355/3 R
[58] Field of Search ........ 204/180 R, 299 R, 299 EC; 350/160 R, 267; 355/3 R

[56] References Cited
U.S. PATENT DOCUMENTS

| | | | |
|---|---|---|---|
| 3,909,116 | 9/1975 | Kohashi | 204/299 R X |
| 3,936,172 | 2/1976 | McVeigh | 355/3 R |
| 4,045,327 | 8/1977 | Noma et al. | 204/299 R |
| 4,071,430 | 1/1978 | Liebert | 204/299 R |
| 4,123,346 | 10/1978 | Ploix | 204/299 R |

*Primary Examiner*—Arthur C. Prescott
*Attorney, Agent, or Firm*—Thomas A. Briody; Robert T. Mayer; Paul R. Miller

[57] ABSTRACT

An electrophoretic display device comprises a cell in which a colloidal suspension of pigment particles is contained between associated electrodes and means are provided for the establishment of a potential between the electrodes for the selective transport of pigment particles. This potential permits changing the spatial distribution of pigment particles in specifically defined regions of the display cell. The device also comprises a light transmissive plate associated with the cell, whereby illumination received in the plate is internally reflected, with light coupling between the illumination and selected regions of the cell at which such particles are suitably disposed. The coupled illumination is transmitted by the cell to the observer. The cell regions at which the particles are disposed are switchably selectable.

15 Claims, 5 Drawing Figures

ELECTROPHORETIC DISPLAY DEVICES

BACKGROUND OF THE INVENTION

The invention relates to display and recording devices, particularly those in which images or patterns are formed by means of the electrophoretic migration of particles.

The use of the electrophoresis phenomenon in display devices containing a colloidal suspension layer between electrodes has been contemplated in the prior art, such as represented by U.S. Pat. Nos. 3,612,758 and 3,668,106. These patents are hereby incorporated by reference to provide background information on the chemistry and technology of electrophoretic displays.

A simple electrophoretic image display (EPID) device is shown, which is a passive, light scattering-type display (FIG. 1). This EPID device is implemented as a cell which consists of a colloidal suspension of pigment particles in an organic liquid held between two electrodes, at least one of which is transparent. In one embodiment, the pigment particles are negatively charged with respect to the liquid. If a positive potential is applied to an electrode in electrical contact with the suspension, the negatively charged pigment particles will be attracted to that electrode. A negative potential on an electrode repels the particles.

One side panel of the device is made of a transparent material such as glass, coated with a transparent, electrically-conducting layer. When light-colored pigment is attracted to this side panel electrode, the observer looking at the panel sees the reflected color of the pigment. A dark-colored dye is included in the suspending medium, so that the pigment at the back of the cell is obscured by the opaque dye and the observer sees only the reflected color of the dye. When the polarity of the voltage on the electrodes is reversed, the position of the color is reversed. The described EPID display cell also possesses "memory" since the particles remain on the electrodes after the applied voltages are removed due to chemical, electrical, or van der Waals forces.

U.S. patent application Ser. No. 854,117, filed on Nov. 23, 1977 by Dalisa and Singer and assigned to the assignee of the present application, (which application is hereby incorporated herein by reference and is included in the present specification as if set forth at length herein) discloses an electrophoretic image display ("EPID") device which contains an opaque insulating fluid containing particles of at least one color pigment in suspension, essentially all such particles having a charge of one polarity. The device further includes a main first electrode, main second electrodes spaced from the first electrode, with the fluid disposed between the first and second electrodes. An insulating layer is adherently provided at least partially over the second electrode.

A control third electrode is interposed between the first and second electrodes, and is separated from the second electrodes by the insulating layer, for selectively adjusting the electric field between the first and second electrodes to establish a threshold for transporting the particles, causing an image to be formed on the main electrodes by the presence or absence of the particles.

Another important feature of the invention of the above application is an electrophoretic display device having a first plurality of electrodes including spaced conductive elements insulated from each other. There is provided a dielectric fluid having pigment particles homogeneously dispersed therein with a charge furnished to individual ones of the particles. The device includes a second electrode having conductors spaced from the first plurality of electrodes by the dielectric fluid. An electrical field is applied across selected ones of the first electrodes and second electrode whereby charged particles migrate along the electric field electrophoretically in imagewise configuration to one of electrodes.

The electric field between the first plurality and the second electrodes is adjusted for controlling the migrating particles.

While the device disclosed in the above application of Dalisa et al are highly desirable and provide a significant advance in the art, they, as well as other EPID devices that operate by scattering light, are not always desirable because they require ambient illumination and cannot be used in a back-lighted operation. The presently disclosed light-transmitting EPID devices overcome this shortcoming and provide additional benefits by not requiring the presence of an opaque dye in the insulating fluid so as to prevent light reflected from colloidal particles that are not present at "written" areas of the display, from reaching the viewer.

DESCRIPTION OF THE PREFERRED EMBODIMENTS

The light-transmitting electrophoretic image display (EPID) device according to the present invention has excellent brightness and contrast with such high contrast being maintained over a very wide range of viewing angles (up to ±80°).

Figure 1:
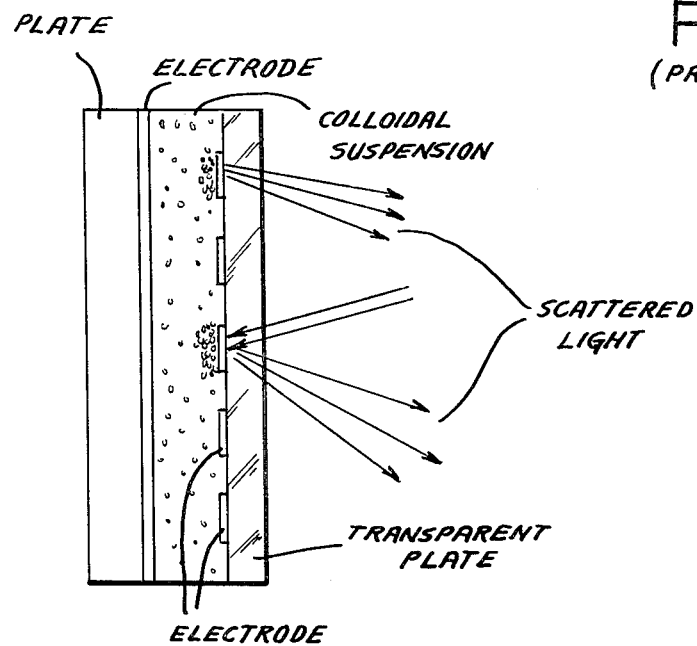
FIG. 1 is a sectional side elevation view schematically depicting an electrophoretic display device according to the prior art cell.
Figure 2:
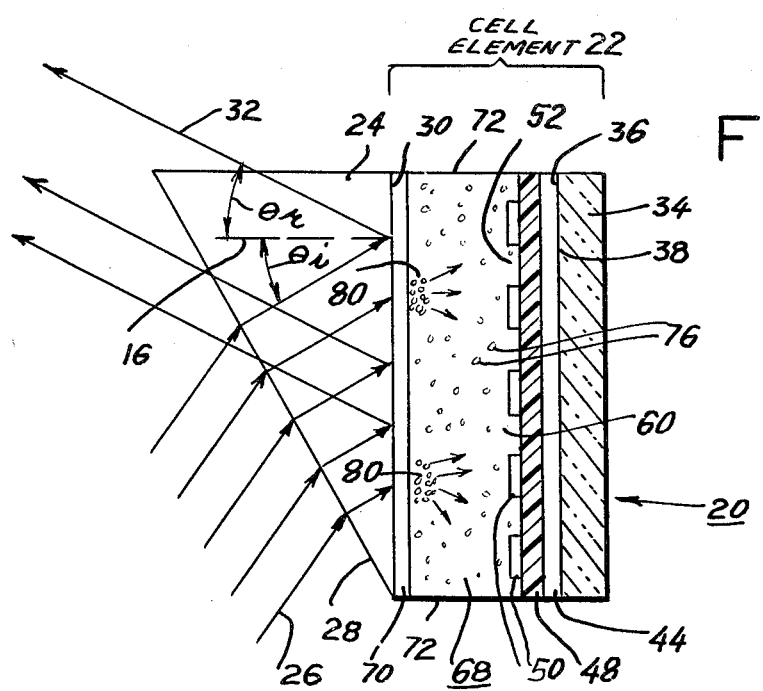
FIG. 2 is a sectional side elevation view schematically depicting a light-transmitting EPID cell according to an embodiment of the present invention.
Figure 3:
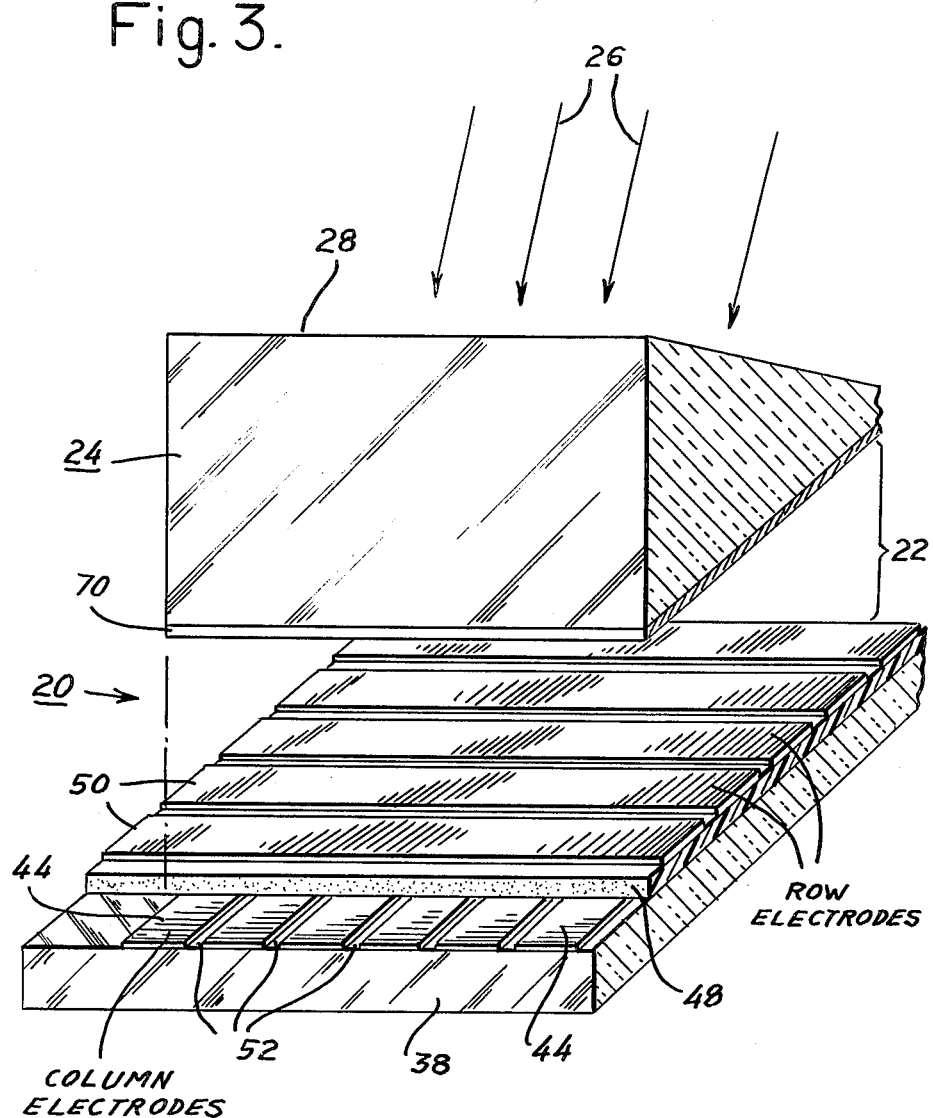
FIG. 3 is a cutaway perspective view of the device shown in FIG. 2.

Referring to FIGS. 2 and 3, there is schematically shown a sectional side elevation view of an EPID device 20 according to a preferred embodiment of the present invention. The electrophoretic display device 20 contains an electrophoretic cell element 22 (described below) and a light transmissive body or panel 24 that can receive illumination 26 and serve to cause total internal reflection of such illumination. The light transmissive body 24 comprises, in this embodiment, an optical prism having first and second surfaces 28, 30 with the first prism surface 28 being adapted to receive illumination 26, which illumination is refracted toward the second prism surface 30 as shown. The illumination is reflected at the interface between the colloidal suspension and the second surface 30 (as indicated by arrows 32), i.e., total internal reflection of the illumination or light rays occurs, except at predetermined areas of the second surface 30, as indicated hereinafter. The cell element 22 comprises a light transmissive sheet or plate 34 having first and second major surfaces 36, 38, respectively, the sheet 34 being disposed so that the first surface 36 thereof faces the second surface 30 of the light transmissive body 24. The cell element 22 of the EPID device 20 includes, in addition to the flat panel or substrate 34 (which can be of glass or transparent plastic of, e.g., about 1.5 mm thickness), a plurality of parallel light transmitting (e.g., transparent) conductive strips 44 disposed at the first major surface 36 of the panel 34, an insulating layer 48, a plurality of light transmitting row electrodes 50, a colloidal suspension 60, and a light transmissive electrode layer 70, as described in detail below.

The conductive strips 44 serve as column electrodes and can be composed of, for example, indium oxide typically applied to the panel 34 by means of sputtering. In the present embodiment, the column electrodes 44 are typically 3000 A. thick and have a width of 2.5 mm and their length depends upon the extent and size of the display device itself.

The panel 34 and the column electrodes 44 are covered with the light transmissive insulating layer 48 that can be, for example, a photoresist or other dielectric material, and the insulating layer 48 is, e.g., from 5 to 50 um thick and applied by a dip coating process. The row electrodes 50 (which preferably are of transparent material, such as tin oxide or indium oxide, for example) are disposed at the available surface of the insulating layer 48 in the form of parallel strips extending transversely to the column 44. The row electrodes 50 can be of aluminum instead of transparent material so long as transparent areas are available for light to be transmitted through the cell, and can be formed by vacuum evaporation. These electrodes 50 are separated, at least in part, from the column electrodes 44 by the insulating layer 48. In general, either of the row or column electrodes can be light opaque so long as at least a major portion of the cell area is light transmissive so as to permit light to pass therethrough. The row electrodes 50 can have a thickness of about 700 A., and a width of about 2.5 mm. The interelectrode spacing 52 of the row electrodes 50 can be similar to that of the column electrodes 44, i.e., from 25-100 um.

In a preferred form, the row electrodes 50 and insulating layer 48 are patterned as described in the above Dalisa et al. application, and have minute pockets or holes (not shown) which extend down to the column electrodes 44. While this form of electrode arrangement is preferred, other electrode systems can be used in the present invention, e.g., a simple patterned electrode system such as a seven-segment numeric system.

The above disclosed holes (not shown) of the row electrodes 50 and insulating layer 48, extend completely through the respective row electrodes 50 and insulator material 48, and expose the column electrodes 44 to the electrophoretic fluid 60, so that the row electrodes 50 serve as a control grid. The holes, therefore, form pockets or cavities which serve as physical wells into which the pigment particles are able to migrate, depending upon the electric field present. The holes can cover at least 50% and more typically 60-70% of the row electrode surface.

An exemplary electrical configuration for operation of a display cell is that described in the above Dalisa et al. application shown in highly schematic form. Briefly described, the continuous electrode 70 is grounded, although in other operation modes, a positive or negative voltage may be applied to the continuous electrode 70. First and second ones of the column electrodes 44 are connected to respective first and second switches (not shown), the row electrodes 50 being connected to other sources of potential. By changing the polarity of the row and column electrodes in a manner similar to that detailed by the Dalisa et al application, the colloidal particles of 76 will be attracted to or repelled from the continuous electrode 70 or the column electrodes 44, as the case may be thereby forming the pattern for the desired image in the appropriate regions of the cell 20. At those regions where the colloidal particles are in contact with the continuous back electrode, light is coupled into the cell as detailed, below.

The panel or prism 24 is provided opposite the second panel 34 and the plane major surface 30 of the first panel 24, which surface 30 faces the second panel 34, is coated with the electrode layer 70. The electrode 70 is preferred to be a continuous transparent electrode layer and can be, e.g., an optically thin layer of indium oxide adherent to the prism 24 and applied by the process of sputtering. Where the electrode layer 70 is not optically thin, its index of refraction influences the operation of the device and must be taken into consideration. The spacing between the continuous electrode 70 (FIG. 2) and the control electrodes 44, 50 can be approximately 40 $\mu$m. The end portions 72 between panels 24 and 34 are sealed (shown in FIG. 2) so that a fluid may be contained therebetween.

The region between the column electrodes 44 and the continuous electrode 70 is filled with an "electrophoretic fluid," such as a colloidal suspension (60 in FIG. 2) comprised of a dielectric fluid 68 (such as, e.g., a mixture of xylene and perchlorethylene) and transparent or colored particles 76 homogeneously dispersed therein. These particles 76 can be transparent or can be pigmented, so long as they are light transmitting. This suspension is more generally referred to throughout the specification and claims as an "electrophoretic fluid." All particles in the suspension have a charge of one polarity which is achieved by the addition of charging agents to the liquid with some examples of suitable agents being an amine attached to a polymeric hydrocarbon chain.

The respective indices of refraction of the insulating fluid 68, the colloidal particles 76, and the plate, or prism 24 and the angles of incidence of the light rays are determined to satisfy the following equation:

$$\theta_c = \sin^{-1}(n_1/n_2)$$

where: $\theta_c$ is the critical angle $n_1$ is the index of refraction of the fluid or of the particles, depending on which is present at a particular area of the interface between the fluid-particle colloidal suspension and the plate or prism, $n_2$ is the index of refraction of the plate or prism at the interface with the colloidal suspension.

The angle of incidence $\theta_i$, which is defined as the angle between a light ray and a normal 66 to the interface between the colloidal suspension and the plate or prism, should exceed the critical angle $\theta_c$ for the fluid but not $\theta_c$ for the particles, in order for satisfactory light coupling to occur between the plate or prism, and the colloidal suspension. The angle of reflection is designated in the figures as $\theta_r$.

Various elements having many, if not all, respective indices of refraction can be used for the present invention, so long as the above relationship is met. The prism 24 can have a refractive index of about 1.7, while the colloidal particles 76 can have a refractive index of about 2.0 and the insulating fluid 68 can have a refractive index of about 1.5. It is important that the insulating fluid 68 of the cell always have a refractive index less than that of the prism 24 and that refractive index for the colloidal particles be such that the angle of incidence not exceed $\theta_c$ so as to achieve the desired light coupling by the particles, as described below.

The visual effects of the EPID operation are shown in FIG. 2, where the front side 38 of the EPID device is used for display, as is shown by the placement of the observer, the back side (at which the prism is located) not providing an image. The observer views through transparent plate or panel 34 the displayed image which is composed of the various light rays coupled into the colloidal suspension by the colloidal particle clusters 80 attracted to the continuous electrode 70 by the electrical addressing system comprising the various electrodes 44, 50, 70. Since the electrophoretic fluid 68 is transparent, the light coupled by the colloidal particle aggregates or clusters 80 passes therethrough and through the transparent electrodes 50, 44, and insulating layer 48, to the observer. The colloidal particles 76 do not materially aggregate in the region of the transparent electrode 50 and insulating layer 48 so the observer 1 sees light transmitted through the cell from the areas of the colloidal particle clusters 80. Those areas of the continuous electrode 70 that are substantially free of aggregates of the particles 76 do not couple the incident illumination at the colloid-plate interface at electrode 70 into the colloidal suspension so that no significant amount of light is transmitted at these areas, which cause corresponding parts of the image to be dark. No light is transmitted at these parts because the fluid has a refractive index sufficiently lower than the prism 24 so that $\theta_i > \theta_c$. Light coupling by the particles is achieved because they have an index of refraction sufficiently high compared to the index of refraction of the prism so that $\theta_i < \theta_c$. In one embodiment of the invention, a light colored yellow pigment is used. The display cell possesses "memory" since the pigment particles remain on or adjacent to the electrode 70, when the applied voltages are removed, due to electrical, chemical and van der Waals forces. Where physically larger displays are desired, various arrangements employing the various embodiment of the present invention can be utilized, e.g., one in which a number of arranged prisms, such as prism 24 in FIG. 2, are disposed on the display cell in the place of a single larger prism, each of the arranged prisms functioning in the same way as prism 24.

Figure 4:
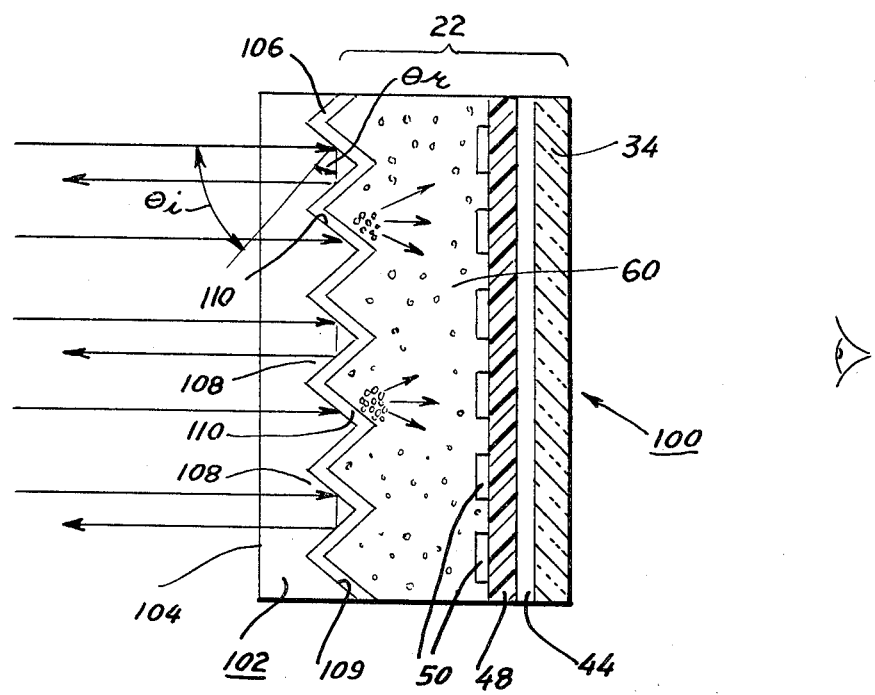
FIGS. 4 and 5 are sectional side elevation views schematically depicting light-transmitting EPID cells according to further respective embodiments of the present invention.

According to a second embodiment of the present invention, the electrophoretic display system 100 (FIG. 4) comprises an electrophoretic cell element 22 comparable to that of the embodiment shown in FIG. 2, with corresponding elements of the embodiments of FIGS. 2 and 4 identically numbered. The present system comprises a second plate 102 which has a first surface 104 that has a general profile of a sawtooth and an opposite second surface that is substantially flat. A continuous electrode 106, whose profile generally resembles that of the surface 104, is disposed at the first surface 104, and the refractive index relationships above described with regard to the embodiment of FIG. 2 apply to the present embodiment, as does the relationship for the critical angle $\theta_c$.

The mode of operation of the system 100 is generally the same as that for the system of FIG. 2. Specifically, the electrode potentials are applied so that particle aggregates 80 are formed at the desired areas of the continuous electrode 104, as shown in FIG. 4. The angle of incidence $\theta_i$ at the interface between the plate or prism 102 and the colloidal suspension is such that total internal reflection occurs at those areas 108 of the interface that are substantially free of particle aggregates and the reflected light is retroreflected out of the plate 102, and such that light coupling occurs at other areas 110 of the interface at which colloidal particle aggregates 80 are located. The light coupling precludes total internal reflection at these other interface areas 110, and light passes through the cell to the observer. Those areas 108 at which total internal reflection occurs will appear as dark areas of the image and the light transmitted through the cell provides the light areas.

Figure 5:
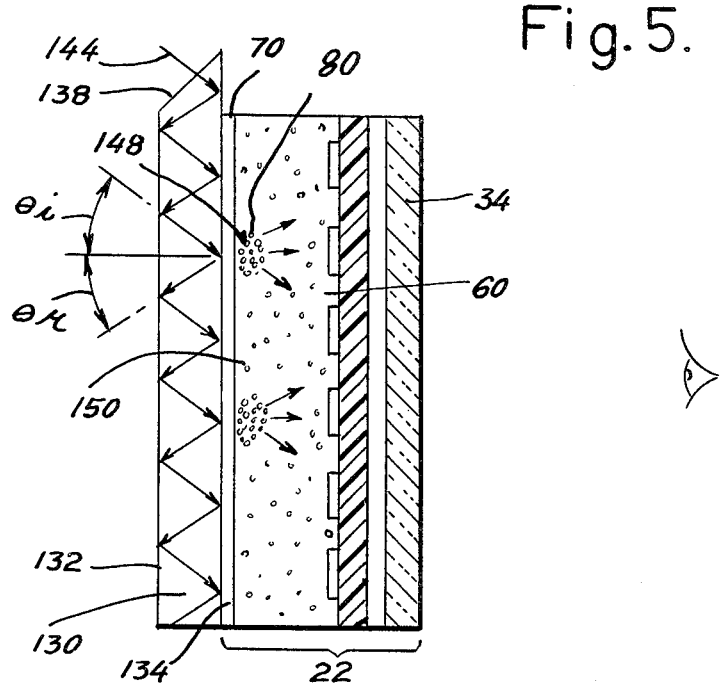

According to a further embodiment (FIG. 5) of the invention, the second plate 130 of the system that is employed with a cell element 22 (similar to that shown in FIG. 2, with similar components being identically numbered) comprises plane parallel first and second major surfaces 132, 134, with the continuous electrode 70 of the cell element located at the second surface 134. At an end of the plate 130, a light-receiving surface 138 is angularly disposed with respect to the major surfaces to provide edge lighting effects where light entering surface 138 is trapped by total internal reflection within plate 30, except as described hereinafter.

Illumination impinging upon surface 138 enters the plate 130, where it is reflected as shown between the surface 134 at the interface between the plate 130 and the suspension 60, on the one hand, and the surface 132 between the plate 130 and air, on the other hand. The surface 132 may be provided with an opaque layer, e.g. felt cloth or black plastic. Light is coupled into the suspension 60 at those interface areas 148 at which colloidal particle clusters 80 are formed and is reflected from other interface areas 150 substantially free of the coupling colloidal particles. The coupled light passes through the cell to the observer, as described above, with no light emanating from the cell at those regions 150 which are free of the clusters 80, hence providing a light and dark image of the information written into the cell. The areas 148 having the clusters 80 or the other areas 150 without such clusters can be considered the "writing" embodying the displayed information.

What is claimed:
1. An electrophoretic display system, comprising:
   (a) a cell element including
      (i) an insulating fluid containing colloidal particles in suspension, said fluid and said particles having respective refractive indices that are different from each other, a substantial number of said particles having a charge of one polarity;
      (ii) a light transmissive first electrode;
      (iii) a light transmissive second electrode spaced from said first electrode, said fluid being disposed between said first and second electrodes; and
      (iv) a light transmissive first plate element disposed at one of said first and second electrodes;
   (b) a light transmissive second plate element disposed at the other of said first and second electrodes, said electrodes being disposed between said plate elements, said second plate element having a first surface adjacent to said electrode and a second surface more removed therefrom, said second plate element having a refractive index greater than that for said fluid;
   (c) means for selectively moving said colloidal particles to positions adjacent to said second light trans- missive plate element to produce light coupling between said cell element and said second plate element; and (d) means for directing illumination to said second plate element, so that said illumination enters said second plate element and is totally internally reflected except for those positions at said first surface of said second plate element at which said particles are located.

2. An electrophoretic display system as in claim 1, wherein said second light transmissive plate element receives and internally reflects said illumination, said internal reflection occurring at the interface between said second plate element and said fluid.

3. An electrophoretic display system as in claim 2, wherein said second light transmissive plate element comprises a prism.

4. An electrophoretic display system as in claim 3, wherein said particles have a refractive index exceeding that of said fluid, and the refractive indices of said particles and said second plate element define a critical angle which is greater than the angle of incidence of said illumination at said first surface.

5. An electrophoretic display system as in claim 3, wherein said light transmissive plate has a refractive index of about 1.7, said fluid has a refractive index of about 1.5 and said particles have a refractive index of about 2.0.

6. An electrophoretic display system as in claim 2, wherein said second light transmissive plate element comprises a member having said first surface with a generally sawtooth profile and said second surface being substantially flat, said illumination being totally internally reflected from those regions at said first surface substantially free of said particles and being coupled into said fluid at said portions at which said particles are located.

7. An electrophoretic display system as in claim 6, wherein said particles have a refractive index exceeding that of said fluid, and the refractive indices of said particles and said second plate element define a critical angle which is greater than the angle of incidence of said illumination at said first surface.

8. An electrophoretic display system as in claim 6, wherein said light transmissive plate has a refractive index of about 1.7, said fluid has a refractive index of about 1.5 and said particles have a refractive index of about 2.0.

9. An electrophoretic display system as in claim 2, wherein said second surface of said second light transmissive plate element is angularly disposed with respect to said first surface and is adapted to receive said illumination, and said second plate element further comprises a third surface substantially parallel to said first surface whereby said illumination is internally reflected between said first and third surfaces at those regions at said first surface substantially free of said particles and is coupled into said fluid at said positions at which said particles are located.

10. An electrophoretic display system as in claim 9, wherein said particles have a refractive index exceeding that of said fluid, and the refractive indices of said particles and said second plate element define a critical angle which is greater than the angle of incidence of said illumination at said first surface.

11. An electrophoretic display system as in claim 9, whrein said second light transmissive plate element has a refractive index of about 1.7, said fluid has a refractive index of about 1.5, and said particles have a refractive index of about 2.0.

12. An electrophoretic display system as in claim 1, wherein said particles have refractive index exceeding that of said fluid, and the refractive indices of said particles and said second plate element define a critical angle which is greater than the angle of incidence of said illumination at said first surface.

13. An electrophoretic display system as in claim 12, wherein said particles have a refractive index less than that of said second plate element.

14. An electrophoretic display system as in claim 12, wherein said particles have a refractive index greater than that of said second plate element.

15. An electrophoretic display system as in claim 1, wherein said first and second electrodes comprise respective segments including an x-y addressing system.

* * * * *